3,201,358
METHOD FOR PREPARING A POLY-
URETHANE FOAM
Fritz Hostettler and Eugene F. Cox, Charleston, W. Va.,
assignors to Union Carbide Corporation, a corporation
of New York
No Drawing. Filed Oct. 2, 1962, Ser. No. 227,943
4 Claims. (Cl. 260—2.5)

The present invention relates to methods for accelerating reactions of compounds having a reactive group of the formula —N=C=Y, in which Y is oxygen or sulfur, with active hydrogen-containing compounds as determined by the Zerewitinoff method described in J. Am. Chem. Soc., vol. 49, page 3181 (1927). The methods of the invention are broadly useful in promoting reactions of isocyanates and isothiocyanates with a wide variety of active hydrogen-containing compounds and have found particular and immediate applicability in the preparation of polyurethanes, a class of organic polymeric materials formed by the reaction of polyfunctional compounds containing active-hydrogen atoms and polyisocyanates and polyisothiocyanates which are useful in the manufacture of gum stocks, elastomeric materials and the like.

The present application is a continuation-in-part of application Serial No. 778,559, by F. Hostettler and E. F. Cox, filed on December 8, 1958, now abandoned.

A considerable number of materials have heretofore been proposed as catalysts for accelerating isocyanate reactions generally and polyurethane preparations in particular. Tertiary amines have received considerable attention as catalysts of merit but a disadvantage entailed in their use is the excessive amount which must necessarily be employed in order to achieve satisfactory reaction rates. In our copending application, U.S. Serial No. 702,241, filed December 12, 1957, now U.S. Patent No. 3,061,557, there are disclosed certain catalysts which are ideally suited for accelerating reactions of organic compounds having one or more —N=C=Y groups in which Y is oxygen or sulfur with compounds having groups containing active hydrogen atoms. Reaction rates that are obtainable in accordance with the methods disclosed therein are up to many thousand times the rates achieved with the previously proposed catalysts.

We have now discovered quite unexpectedly that catalyst compositions comprising antimony trichloride, titanium tetrachloride, or dioctyl lead dichloride, in combination with tertiary amines in which the nitrogen atom is bonded to three aliphatic and cycloaliphatic carbon atoms, are particularly adapted for use in accelerating the reaction between isocyanates or isothiocyanates and compounds having groups containing active hydrogen atoms. As used in the specification and appended claims, the term "aliphatic carbon atoms" is used in its generic sense and applies to straight-chain aliphatic carbon atoms as well as to cycloaliphatic carbon atoms. As has been pointed out in our copending application mentioned supra the reaction rates obtainable employing the aforementioned catalysts alone are up to many thousand times the rates achievable with tertiary amine catalysts. It has been observed that catalyst compositions of the present invention apparently exert a synergistic effect since the reaction rates that are obtainable in accordance with the methods of the present invention are of the order of from about two to about seven times the best reaction rate of the catalyst of said application when employed as the sole catalyst for the reaction.

The tertiary amines which are useful as components of the catalyst compositions suitable for use in the methods of the invention include tertiary amines substantially unreactive with isocyanate groups and tertiary amines containing active hydrogen atoms reactive with isocyanate groups. Typical tertiary amines which are substantially unreactive with isocyanate groups include triethylamine, tributylamine, trioctylamine, N-methylmorpholine, N-ethylmorpholine, N-octadecylmorpholine (N-cocomorpholine), N-methyldiethanolamine, N,N-dimethylethanolamine, N,N'-bis(2-hydroxypropyl)piperazine, N,N,N',N'-tetramethylethylenediamine, N,N,N',N'-tetramethyl-1,3-propanediamine, triethylenediamine (1,4 - diazobicyclo [2,2,2]octane), 1,4-bis(2-hydroxypropyl)-2-methylpiperazine, N,N-dimethylbenzylamine, N,N-dimethylcyclohexylamine, benzyltriethylammonium bromide, bis(N,N-diethylaminoethyl) adipate, N.N-diethylbenzylamine, N-ethylhexamethyleneamine, N-ethylpiperidine, alpha-methylbenzyldimethylamine, dimethylhexadecylamine, dimethylcetylamine, and isocyanates and metal compounds containing tertiary nitrogen atoms.

Typical tertiary amines containing active hydrogen atoms reactive with isocyanate groups include triethanolamine, triisopropanolamine, N-methyldiethanolamine, N-ethyldiethanolamine, polyoxyalkylene polyol polymers and copolymers of alkylene oxides, such as propylene oxide, ethylene oxide, homopolymers, copolymers and mixtures thereof started with triethanolamine, triisopropanolamine, ethylenediamine, ethanolamine, diethylenetriamine and the like. Still other tertiary amines containing active hydrogen atoms reactive with isocyanate groups include polyesters based on polyols such as illustrated above including triethanolamine, triisopropanolamine, N-alkyl diethanolamines and the like as well as polycarboxylic acids containing tertiary nitrogen atoms.

The molar concentrations of the ingredients of the catalyst compositions can be varied over a wide range since the molar concentrations of the respective ingredients is not necessarily a critical feature of the invention. Molar concentration ratios of metal compound to amine can be varied from 100:1 to 1:10,000 although molar concentrations above and below the above recommended ratios can be employed if desired.

The active-hydrogen containing materials include monomeric and polymeric compounds.

Typical monomeric materials include alcohols, phenols, amines, amides, acids, ureas, oximes, hydrazines, semi-carbazones, keto-esters, alpha-diketones, beta-keto-aldehydes, mercaptans and the like.

Typical polymeric materials include polyesters, polyethers, polyesterethers and polyesteramides. Polyethers which can be employed in conjunction with the curing compositions of the invention include linear and branched polyethers having at least one and preferably a plurality of ether linkages and containing at least two hydroxyl groups and being substantially free from functional groups other than hydroxyl. Preferred polyethers are the polyoxyalkylene polyols. Among the polyoxyalkylene polyols which are useful in the practice of this invention are the polyethylene glycols having average molecular weights of 200, 400 and 600 and the polypropylene glycols having average molecular weights of 400, 750, 1200 and 2000. Polymers and copolymers of polyoxyalkylene polyols are also adaptable in the process of this invention as well as the block copolymers of ethylene and propylene oxide. Among the copolymers of polyoxyalkylene polyols, and particularly propylene oxide, that deserve some special mention are the propylene oxide adducts of ethylene glycol, glycerol, 1,2,6-hexanetriol, trimethylolpropane, trimethylolethane, pentaerythritol, sorbitol tris(hydroxyphenylpropane), triethanolamine, triisopropanolamine, ethylenediamine, diethylenetriamine and ethanolamine, more fully described hereinafter. Linear and branched copolyethers of ethylene oxide and propylene oxide have also been found to be useful in making the foamed products of this invention. Preferred copolymers of propylene oxide and ethylene oxide are those containing 10 percent ethylene oxide in molecular weights of 500, 2000, 3000 and 4000.

Further useful types of polyethers are block copolymers prepared from propylene oxide and ethylene oxide. These polyethers can be characterized by reference to the following general formula:

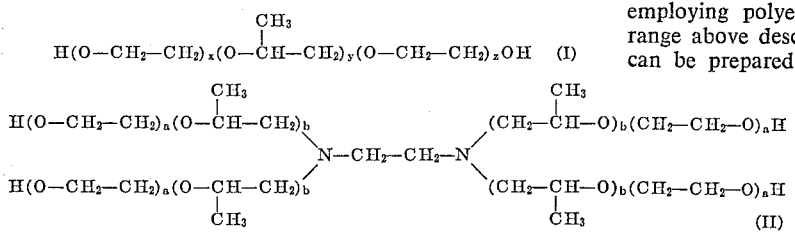

wherein Formula I subscripts, $x$, $y$ and $z$, represent positive integers in the range of from 2 to 100 and the subscripts $a$ and $b$ of Formula II represent positive integers in the range of from 1 to 200.

Polyethers having a highly branched chain network are also useful. Such highly branched chain polyethers are readily prepared from alkylene oxides of the type above described and initiators having a functionality greater than two. Highly branched polyethers have the advantage of making possible cross linking without the interaction of urea or urethane groups with the isocyanate groups. This has the advantage of making a larger proportion of the isocyanate used available for the evolution of carbon dioxide and the reducing of the overall amount of isocyanate that is required in the preparation of the foamed polymer.

The higher functional initiators that are useful with the alkylene oxides, described above, include polyols, polyamines and amino alcohols having a total of three or more reactive hydrogen atoms on hydroxyl and primary or secondary amino groups. Suitable polyols include triols, such as glycerol, trimethylolpropane, butanetriols, hexanetriols, trimethylolphenol, tris(hydroxyphenyl)propane, tris(hydroxyxylyl)propane, Novalaks, trialkanolamines, various tetrols, such as erythritol and pentaerythritol; pentols; hexols, such as dipentaerythritol and sorbitol, as well as alkyl glucosides, carbohydrates, polyhydroxy fatty acid esters, such as castor oil and polyoxy alkylated derivatives or polyfunctional compounds having three or more reactive hydrogen atoms, such as, for example, the reaction product of trimethylolpropane, glycerol and other polyols with ethylene oxide, propylene oxide or other epoxides or copolymers thereof, e.g., copolymers of ethylene and propylene oxides. Higher functional amino alcohols and polyamines include, by way of example, ethanolamine, diethanolamine, triethanolamine, isopropanolamine, diisopropanolamine, triisopropanolamine, 2 - (2 - amino - ethylamino)ethanol, 2-amino - 2 - (hydroxymethyl) - 1,3 - propanediol, diethylenetriamine, triethylenetetramine, urea and urea-formaldehyde polymers as well as various aryl polyamines, such as 4,4'-,4''-methylidynetrianiline.

Another means of increasing the degree of branching, if desired, when employing linear polyethers, is to include a highly functional initiator, as described above, in the mixture charged to the reaction.

Preferred polyethers of the branched type are those prepared by adding propylene oxide to various diols, triols, tetrols and polyols as starters to produce adducts of various molecular weights. Polyethers which deserve special mention are the 1,2,6-hexanetriol and glycerol adducts of propylene oxide having molecular weights of 250, 500, 700, 1500, 2500, 3000 and 4000.

The amount of highly functional initiator normally employed with the linear type polyethers described above is an amount in the range of from 0.5 to 6.0 percent by weight of said initiator based on the weight of polyether charged to the reaction.

Generally, the polyethers suitable for employment can be conveniently characterized as normally liquid (although meltable solid polyethers are not excluded), pourable polyethers having viscosities in the range of from 50 centipoises to about 500,000 centipoises at room temperature (i.e., 25° C.) and having preferably molecular weights in the range of from 200 to about 10,000. When employing polyethers having molecular weights in the range above described, it is readily apparent that foams can be prepared which are tailor-made to the requirements of specific applications. For example, where maximum flexibility of the foamed polymer is a primary requirement, the polyether should, for optimum results, have a molecular weight of approximately 1500–7000, if it is a branched type polyether and somewhat less, about 1000–2000, if it is a substantially linear type polyether. While it has not been definitely established for semi-rigid foams, the molecular weight of branched polyethers should be in the range of from 700 to about 1500 and of linear polyethers in the range of from 250–1000. When it is desired to produce a rigid foam, the molecular weight of the starting polyether should be in the range of from 250–1000 if the polyether is branched; if linear, the molecular weight of the polyether should be somewhat less, that is, about 200–500.

The polyesters and polyesteramides are formed from polyfunctional materials, such a polycarboxylic acids, aminocarboxylic acids, glycols, aminoalcohols, diamines and the like. The polyesters are readily prepared by reacting at least two bifunctional ingredients; a glycol and a dibasic acid. The polyesteramides are readily prepared by reacting a dibasic acid with a mixture comprising a major amount of a glycol and a minor amount of an aminoalcohol or a diamine. Additionally, a wide variety of complex polyesters and polyesteramides can be formed by the reaction of a plurality of acids, glycols, aminoalcohol and polyamines.

Representative polyesters and polyesteramides which have utility include polyesters and polyesteramides prepared from ethylene glycol and adipic acid; propylene glycol and adipic acid; ethylene glycol (80 mol percent), propylene glycol (20 mol percent) and adipic acid; ethylene glycol (80 mol percent), propylene glycol 1,2 (20 mol percent) and azelaic acid; ethylene glycol (80 mol percent), propylene glycol 1,2 (20 mol percent) and sebacic acid; ethylene glycol (80 mol percent), propylene glycol 1,2 (20 mol percent) and dilinoleic acid (20 mol percent); adipic acid (80 mol percent); ethylene glycol (80 mol percent), glycerine monoethyl ether (20 mol percent) and adipic acid; ethylene glycol (80 mol percent), butylene glycol 1,4 (20 mol percent) and adipic acid; ethylene glycol (80 mol percent), propylene glycol 1,3 (20 mol percent) and adipic acid; ethylene glycol (80 mol percent), pentane diol 1,4 (20 mol percent) and adipic acid; ethylene glycol (80 mol percent), glycerine monoisopropyl ether (20 mol percent) and adipic acid; ethylene glycol (80 mol percent), propylene glycol 1,2 (from 18 to 5 mol percent), ethanolamine (from 2 to 15 mol percent) and adipic acid; ethylene glycol (80 mol percent), propylene glycol 1,2 (20 mol percent) and maleic acid (from 3 to 6 mol percent), adipic acid (from 97 to 94 mol percent); ethylene glycol (80 mol percent), propylene glycol 1,2 (from 19 to 17 mol percent), piperazine (from 1 to 3 mol percent) and adipic acid; ethylene glycol (80 mol percent), propylene glycol 1,2 (from 18 to 5 mol percent), dihydroxyethyl aniline (from 2 to 15 mol percent) and adipic acid; ethylene glycol (80 mol percent), butylene glycol 1,4 (20 mol percent) and adipic acid; ethylene glycol (80 mol percent), diethylene glycol (20 mol percent) and adipic acid; ethylene glycol (from 90 to 10 mol percent), propylene glycol 1,2 (from 10 to 90 mol percent) and adipic acid; ethylene glycol (from 90 to 10 mol percent), propylene glycol 1,2 (from 10 to 90 mol percent) and azelaic acid.

The organic polyisocyanates and polyisothiocyanates which can be employed with utility are those of the general formula:

$$R(NCY)_x$$

in which $x$ is two or more and R can be alkylene, substituted alkylene, arylene, substituted arylene, a hydrocarbon or substituted hydrocarbon containing one or more aryl-NCY bonds and one or more alkyl-NCY bonds, a hydrocarbon or substituted hydrocarbon containing a plurality of either aryl-NCY or alkyl-NCY bonds. R can also include radicals such as —R—Z—R— where Z may be any divalent moiety such as —O—, —O—R—O—, —CO—, —CO$_2$—, —S—, —S—R—S—, —SO$_2$—, etc. Examples of such compounds include hexamethylene diisocyanate, 1,8-diisocyanato-p-menthane, xylylene diisocyanates, (OCNCH$_2$CH$_2$CH$_2$OCH$_2$)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane - 4,4',4" - triisocyanate, xylylene-alpha, alpha'-diisothiocyanate, and isopropylbenzene-alpha,4-diisocyanate.

Further included are dimers and trimers of isocyanates and diisocyanates and polymeric diisocyanates of the general formulae:

$$(RNCY)_x \text{ and } [R(NCY)_x]_y$$

in which $x$ and $y$ are two or more, as well as compounds of the general formula:

$$M(NCY)_x$$

in which $x$ is one or more and M is a monofunctional or polyfunctional atom or group. Examples of this type include ethylphosphonic diisocyanate, C$_2$H$_5$P(O)(NCO)$_2$; phenylphosphonous diisocyanate, C$_6$H$_5$P(NCO)$_2$; compounds containing a ≡Si—NCY group and isocyanates derived from sulfonamides [R(SO$_2$NCO)$_2$].

The methods of the invention can be carried out continuously or by batch process. A particular embodiment of the invention includes methods for producing, batchwise or continuously, polyurethanes suitable for the manufacture of foams by the so-called "prepolymer" and "semi or quasi prepolymer" techniques. Briefly, the "prepolymer" technique comprises reacting a compound containing at least two active hydrogen atoms and a polyisocyanate in the presence of the the catalyst compositions herein disclosed in such proportions as to produce a liquid product which requires only the addition of water and catalyst to give a complete foam. In the "semi or quasi prepolymer" technique, the active hydrogen containing compound is reacted with a large excess of polyisocyanate to produce a liquid product of relatively low viscosity and a high isocyanate content. This "semi prepolymer" must be further reacted with additional active hydrogen containing compound or compounds, water and catalyst to produce a foam.

The following examples will serve to illustrate the practice of the invention:

*Example 1*

A recipe was prepared comprising:

(a) 75 grams of a polypropylene glycol having a molecular weight of 2010, and 75 grams of a reaction product of glycerol and propylene oxide having a molecular weight of 2990.
(b) 55.3 grams of an 80:20 mixture of 2,4- and 2,6-tolylene diisocyanate.
(c) 4.0 grams of water.
(d) 1.25 grams of an emulsifier.
(e) 0.1 gram of 1,4-diaza-bicyclo-[2,2,2]octane.
(f) 1.0 gram antimony trichloride.

The resulting foam cured well and had a density of 2.07 lbs./cu. ft.

*Example 2*

A recipe was prepared comprising:

(a) 75 grams of a polypropylene glycol having a molecular weight of 2010, and 75 grams of a reaction product of glycerol and propylene oxide having a molecular weight of 2990.
(b) 55.3 grams of an 80:20 mixture of 2,4- and 2,6-tolylene diisocyanate.
(c) 4.0 grams of water.
(d) 1.25 grams of an emulsifier.
(e) 0.1 gram of 1,4-diaza-bicyclo-[2,2,2]octane.
(f) 1.0 gram antimony trichloride.

The resulting foam cured faster than a similar recipe employing a tertiary amine catalyst alone.

*Example 3*

A recipe was prepared comprising:

(a) 75 grams of a polypropylene glycol having a molecular weight of 2010, and 75 grams of a reaction product of glycerol and propylene oxide having a molecular weight of 2990.
(b) 55.3 grams of an 80:20 mixture of 2,4- and 2,6-tolylene diisocyanate.
(c) 4.0 grams of water.
(d) 1.25 grams of an emulsifier.
(e) 0.1 gram of 1,4-diaza-bicyclo-[2,2,2]octane.
(f) 1.0 gram of titanium tetrachloride.

The resulting foam cured faster than a similar recipe employing a tertiary amine catalyst alone.

*Example 4*

A recipe was prepared comprising:

(a) 75 grams of a polypropylene glycol having a molecular weight of 2010 and 75 grams of a reaction product of glycerol and propylene oxide having a molecular weight of 2990.
(b) 55.3 grams of an 80:20 mixture of 2,4- and 2,6-tolylene diisocyanate.
(c) 4.0 grams of water.
(d) 1.25 grams of an emulsifier.
(e) 0.1 gram of 1,4-diaza-bicyclo-[2,2,2]octane.
(f) 1.0 gram of dioctyl lead dichloride.

The resulting foam cured faster than a similar recipe employing a tertiary amine catalyst alone.

What is claimed is:

1. A method for producing a urethane foam which comprises reacting an organic polyisocyanate with a polyol in the presence of a catalyst and a foaming agent, wherein the catalyst is a mixture of 1,4-diazabicyclo[2,2,2]octane and a metal compound selected from the group consisting of antimony trichloride, titanium tetrachloride, and dioctyl lead dichloride, wherein the molar concentration ratio of said metal compound to said 1,4-diazabicyclo[2,2,2]octane varies from 100:1 to 1:10,000.

2. The method of claim 1 wherein said metal compound is antimony trichloride.

3. The method of claim 1 wherein said metal compound is titanium tetrachloride.

4. The method of claim 1 wherein said metal compound is dioctyl lead dichloride.

No references cited.

LEON J. BERCOVITZ, *Primary Examiner.*

DONALD E. CZAJA, *Examiner.*